US006963454B1

(12) United States Patent
Martins et al.

(10) Patent No.: US 6,963,454 B1
(45) Date of Patent: Nov. 8, 2005

(54) HEAD-MOUNTED DISPLAY BY INTEGRATION OF PHASE-CONJUGATE MATERIAL

(75) Inventors: Ricardo F. Martins, Orlando, FL (US); Jannick Rolland, Chuluota, FL (US); Yonggang Ha, Orlando, FL (US)

(73) Assignee: Research Foundation of the University of Central Florida, Orlando, FL (US)

( * ) Notice: Subject to any disclaimer, the term of this patent is extended or adjusted under 35 U.S.C. 154(b) by 8 days.

(21) Appl. No.: 10/418,623

(22) Filed: Apr. 19, 2003

Related U.S. Application Data

(63) Continuation-in-part of application No. 10/090,070, filed on Mar. 1, 2002, now Pat. No. 6,731,434.

(51) Int. Cl.[7] .......................... G02B 27/14; G09G 5/00
(52) U.S. Cl. .......................... 359/630; 359/636; 345/8
(58) Field of Search .............................. 359/630, 631, 359/636, 638, 640; 345/7–9

(56) References Cited

U.S. PATENT DOCUMENTS

| 3,200,702 A | * | 8/1965 | Giordano | 353/7 |
| 4,348,185 A | * | 9/1982 | Breglia et al. | 434/43 |
| 4,669,810 A | | 6/1987 | Wood | 350/3.7 |
| 4,753,222 A | | 6/1988 | Nishina | 350/470 |
| 5,013,135 A | * | 5/1991 | Yamamura | 359/630 |
| 5,172,272 A | | 12/1992 | Aoki | 359/654 |
| 5,189,452 A | * | 2/1993 | Hodson et al. | 353/94 |
| 5,526,183 A | | 6/1996 | Chen | 359/629 |
| 5,572,229 A | | 11/1996 | Fisher | |
| 5,621,572 A | | 4/1997 | Ferguson | 359/630 |
| 5,808,801 A | * | 9/1998 | Nakayama et al. | 359/630 |
| 6,100,862 A | * | 8/2000 | Sullivan | 345/88 |
| 6,147,805 A | * | 11/2000 | Fergason | 359/630 |
| 6,236,511 B1 | * | 5/2001 | Brown | 359/634 |

* cited by examiner

Primary Examiner—Ricky L. Mack
(74) Attorney, Agent, or Firm—Brian S. Steinberger; Law Offices of Brian S. Steinberger, P.A.

(57) ABSTRACT

This invention has incorporated projective optics and phase conjugate material thus eliminating the requisite use of an external phase conjugate material to provide a see-through head mounted projective display. A key component of the invention is the use of optical imaging technology in combination with projective optics to make this revolutionary technology work. In previous head mounted projective displays the phase conjugate material had to be placed in the environment to display images, but in this invention one is not limited to the use of an external phase conjugate material but further extends its use to outdoor see-through augmented reality to produce images using the see-through head mounted projective display system. Furthermore, this invention extends the use of projective head mounted displays to clinical guided surgery, surgery medical, an outdoor augmented see-through virtual environment for military training and wearable computers.

29 Claims, 14 Drawing Sheets

HEAD-MOUNTED DISPLAY BY INTEGRATION OF PHASE-CONJUGATE MATERIAL

This invention relates to a head mounted projection display (HMPD), and in particular to a compact lens assembly having a projection display interior of the HMPD for a teleportal augmented reality system and this application is a continuation-in-part (CIP) of U.S. patent application Ser. No. 10/090,070 filed Mar. 1, 2002 now U.S. Pat. No. 6,731,434 and was funded in part by grant number 6502562 awarded by the Army STRICOM SNE.

BACKGROUND AND PRIOR ART

Networked virtual environments allow users at remote locations to use a telecommunication link to coordinate work and social interaction. Teleconferencing systems and virtual environments that use 3D computer graphic displays and digital video recording systems allow remote users to interact with each other, to view virtual work objects such as text, engineering models, medical models, play environments and other forms of digital data, and to view each other's physical environment.

A number of teleconferencing technologies support collaborative virtual environments which allow interaction between individuals in local and remote sites. For example, video-teleconferencing systems use simple video screens and wide screen displays to allow interaction between individuals in local and remote sites. However, wide screen displays are disadvantageous because virtual 3D objects presented on the screen are not blended into the environment of the room of the users. In such an environment, local users cannot have a virtual object between them. This problem applies to representation of remote users as well. The location of the remote participants cannot be anywhere in the room or the space around the user, but is restricted to the screen.

Head-mounted displays (HMDs) have been widely used for 3D visualization tasks such as surgical planning, medical training, or engineering design. The main issues of the conventional eyepiece-based HMD technology include tradeoffs between resolution and field-of-view (FOV), and between compactness and eye clearance, the presence of large distortion for wide FOV designs, the conflict of accommodation and convergence, the occlusion contradiction between virtual and real objects, the challenge of highly precise registration, and often the brightness conflict with bright background illumination. The concept of head-mounted projective displays (HMPDs) is an emerging technology that can be thought to lie on the boundary of conventional HMDs, and projective displays such as the CAVE technology.

The basic HMPD concept of projection head-mounted display was early disclosed by Fisher Nov. 5, 1996, in U.S. Pat. No. 5,572,229.

Also a first international presentation was done by Kijima and Ojika in 1997 [See Kijima and Ojika, "Transition between virtual environment and workstation environment with projective head-mounted display." Proceedings of IEEE 1997 Virtual Reality Annual International Symposium, IEEE Computer Soc. Press. 1997, pp. 130–7. Los Alamitos, Calif., USA.].

Also on Apr. 15, 1997, a U.S. Pat. No. 5,621,572 was also issued to Ferguson on the conceptual idea of a display, i.e. optical, system for head mounted display using phase conjugate material and method of displaying an image.

Independently, the technology of HPMD was developed by Parsons and Rolland as a tool for medical visualization [See Parsons and Rolland, "A non-intrusive display technique for providing real-time data within a surgeon's critical area of interest. "Proceedings of Medicine Meets Virtual Reality 98, 1998, pp. $246^{-251}$"]. After the initial proof of concept using off-the-shelf components, a first-generation custom-designed HMPD prototype was built to investigate perception issues and quantify some of the properties and behaviors of phase conjugate materials in an imaging system. Since, the projection system of the first-generation prototype was custom designed using a double-Gauss lens structure and built from commercially available components. The total weight of each lens assembly was about 50 grams (already a significant reduction compared to using off-the-shelf optics) with mechanical dimensions of 35 mm in length by 43 mm in diameter.

Common to all these teleconferencing systems is the use of lenses of various configurations and weights with distortions, lack of clarity and smearing of the televised images. Representative of lenses that might at first glance appear to be useful in the teleconferencing systems are also shown in:

U.S. Pat. No. 5,526,183 by Chen who teaches the use of a lens combining diffractive elements of both glass and plastic to reduce the weight and size of the lens within a conventional helmet mounted display rather than the necessary projective helmet mounted display;

U.S. Pat. No. 5,173,272 by Aoki which discloses a four element high aperture lens with glass elements making it too heavy for helmet mounting;

U.S. Pat. No. 4,753,522 by Nishina et al which lens features all 4 plastic elements and is fully symmetrical which latter property is imposed by its restricted application—a copy machine lens; and, U.S. Pat. No. 4,669,810 by Wood which shows a head-mounted display with many (more than 4) optical elements in the relay optics.

Consequently, there is a need for a HMPD augmented reality display that mitigates the above mentioned disadvantages and has the capability to display virtual objects and environments, superimposes virtual objects on the "real world" scenes, provides "face-to-face" recording and display, be used in various ambient lighting environments, and corrects for optical distortion, while minimizing weight, computational power and time. Lightweight, compactness, enhanced mobility and improved fidelity of the field of view are always of basic importance and/or highly desirable, particularly, for head-mounted devices.

SUMMARY OF THE INVENTION

The first object of the present invention is to provide a HMPD with phase conjugate material integrated for use of see-through augmented reality within the HMPD.

The second object of this invention is to allow extension of the HMPD to mobile outdoors environment, as well as those environments in which the phase conjugate material can not be used in the environment, such as surgical procedures.

The third object of this invention is to provide a user of the HMPD the means of a mobile teleportal augmented reality system with or without the use of phase conjugate material located in the environment.

A preferred embodiment of the invention encompasses a head mounted projection display (HMPD) comprising in combination: a component assembly for displaying computer generated image from a micro display; an optical assembly for projecting virtual images and said computer generated images to a user's eye or eyes for monocular or binocular viewing; phase conjugate material for receiving and projecting said virtual images; an imaging lens for magnification of said phase conjugate material; and, all of which are located internally of the housing of said HMPD assembly. The lens can be other optical elements that may be used for imaging, including Fresnel lens, microlenslet arrays, prisms, folding flat or curved mirrors, adaptive optics components, micro-optics components, phase plates and any combinations of the optical lenses. An additional preferred embodiment relates to a method of forming a HMPD assembly comprising the steps of: positioning the HMPD helmet on the user's head; displaying virtual images to said user's eye or eyes by a micro display disposed within said helmet; providing a phase conjugate material for also displaying said virtual images from a display source integrated with the interior surface of said helmet to said user's eye; and, providing an imaging lens, such as a Fresnel lens and others noted above for magnification of said phase conjugate material whereby said magnified screen is projected to the user's eye or eyes.

Further objects and advantages of this invention will be apparent from the following detailed description of presently preferred embodiments which are illustrated schematically in the accompanying drawings.

DESCRIPTION OF THE PREFERRED EMBODIMENTS

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

It would be useful to discuss the meanings of some words used herein and their applications before discussing the compact lens assembly of the invention including:

HMPD—helmet mounted projection display;
Singlet—single lens element;
EFL—effective focal length;
$F^\#$—f-number;
OAL—overall length;
FOV—field of view (given in degrees for the diagonal of the display);
EPD—entrance pupil diameter;
AMLCD—active matrix display;
Conjugate—image of each other;
Fresnel lens—a lens in which one collapses a surface into annular zones to a thin plate;
Microlenslet array—an array of miniature lenses comprised to replace a conventional lens;
Phase conjugate material—retro-reflective screen;
Distortion—warping of the image;
Arcminutes—an arcminute is the limit of visual acuity of the visual human system with one degree visual angle corresponds to 60 arcminutes;
Color Smear—a small spreading of the color spectrum in a point image;
Modulation—contrast;
DOE—diffractive optical element; and,
MTF—modulation transfer function.

Figure 1:
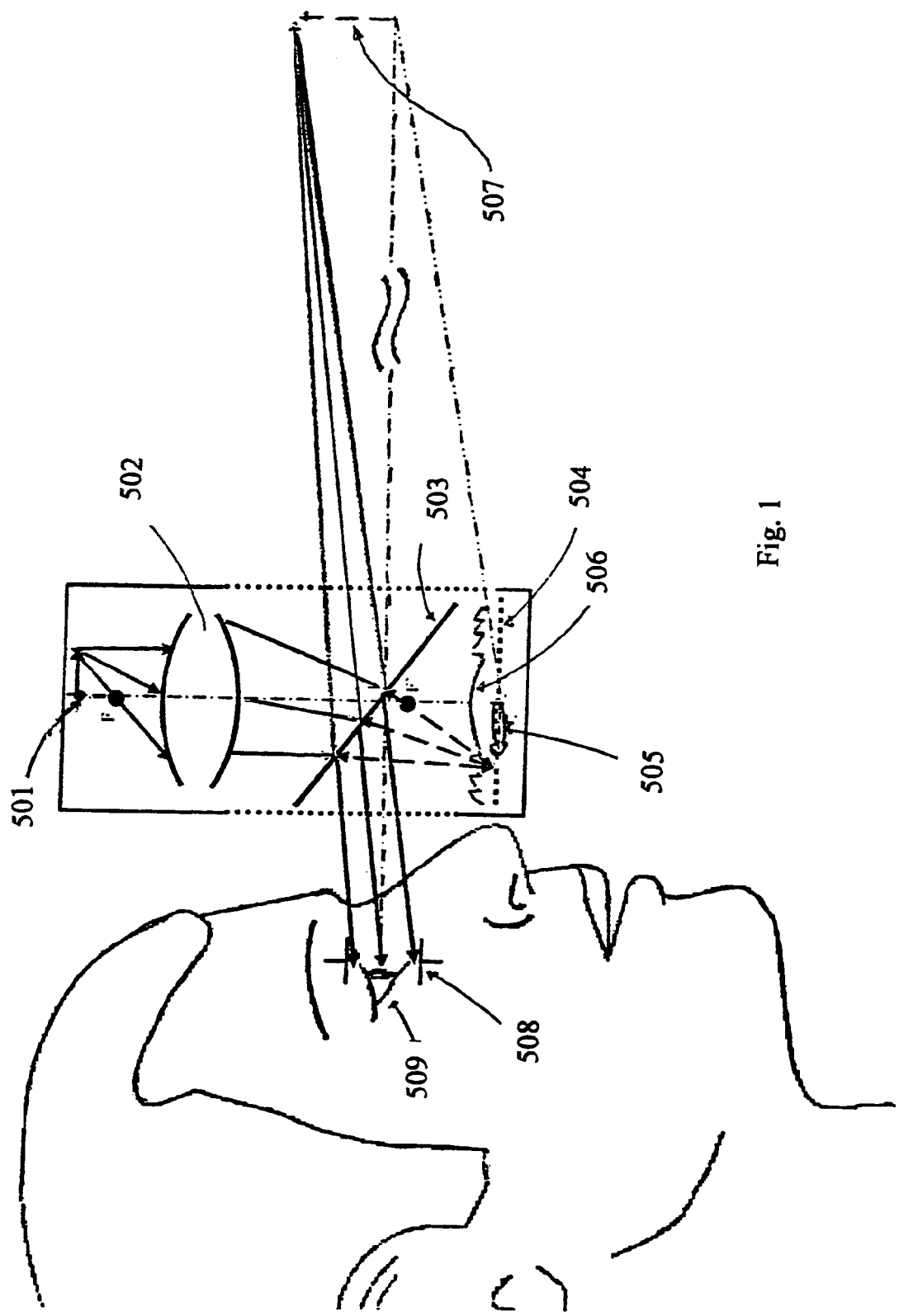
FIG. 1 is a concept illustrative cross-sectional view of the projection head mounted display (HMPD) assembly placed on the user's head, where the novel aspects of the invention are shown.

Referring now to FIG. 1 of the instant Application, a miniature display 501 is located beyond the focal point of a projection lens 502 which is used to display computer-generated images into a virtual environment. Rays traveling from the computer generated miniature active matrix display 501 (exemplified by a 0.6 inch OLED microdisplay purchased from eMagin Corporation) through the novel projection lens 502 (exemplified by an about 42 degree lens produced according to the disclosure of U.S. patent application Ser. No. 10/090,070 filed Mar. 1, 2002) provide an intermediary image 507 which is conjugate to the projected image 505.

When the phase conjugate material screen 504 (purchased from 3M Corporation) is at either the focal plane or within the focal plane of the lens 506 (commercially available from Edmund Scientific), it reflects rays at the same incoming angle in the reverse and opposite direction traveling toward the beamsplitter 503 (commercially available from Edmund Scientific) into the eye 509 of the user of the novel HMPD of the invention. When the lens 506 is placed at its focal plane and combined phase conjugate material at optical infinity. For the case of placing the lens 506 within the focal plane, the phase conjugate material 504 is optically placed at a finite distance from the user's eye 509. The user's eye 509 will perceive the projected image 505 from the exit pupil 508 of the optical system. The unique novelty of the head mounted display of the invention is that all components, i.e., 501–506 and 508–509, is within the helmet of the HMPD as indicated by the dotted lines of FIG. 1.

Figure 2:
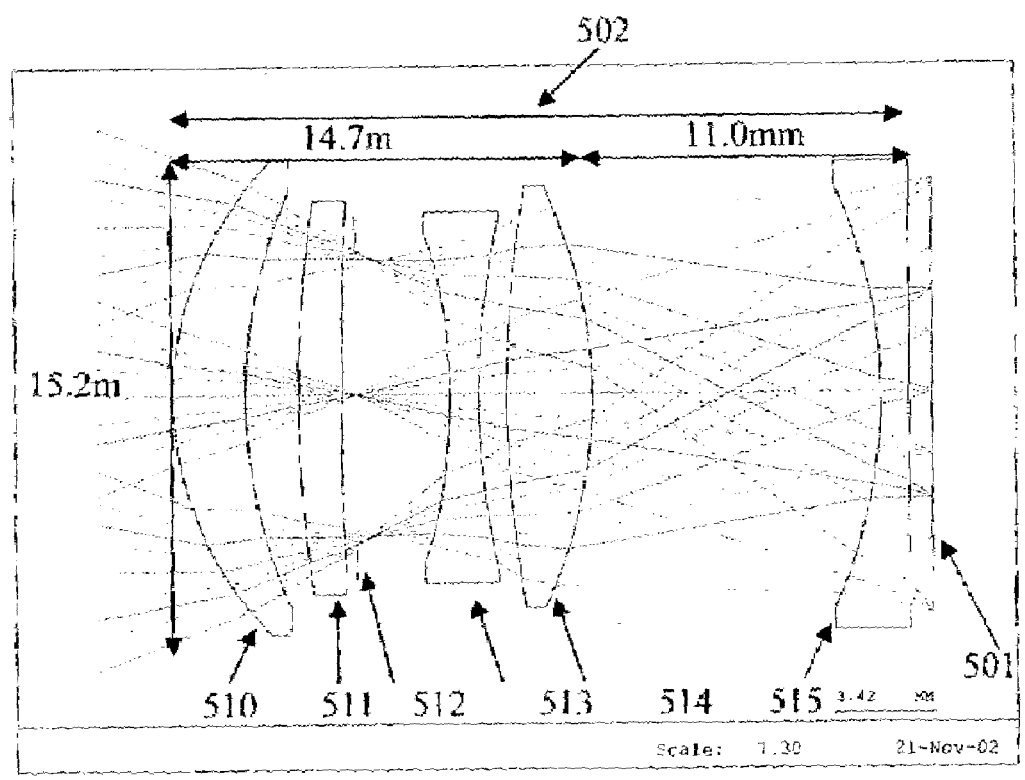
FIG. 2 shows the cross-sectional layout of the novel projection lens layout of the invention.

Refer now to FIG. 2 which shows in cross-section the projection lens 502 referenced in FIG. 1. The lens 502 is composed of a two glass singlet lenses, 510 and 514 respectively, two plastic singlet lenses, 511 and 513 respectively, and the stop surface 512 which is in the middle of glass-plastic and plastic-glass composition. In particular, the second surface of plastic singlet lens 511 is designed with a diffractive optical element (DOE), and the first surface of plastic singlet 513 is an aspherical surface. A single field flattener 515 is placed relatively close to the miniature display 501 to compensate field aberrations. Such a novel optical design makes it possible to achieve compactness, light-weight (<10 g per eye), as well as good performance over the visual spectrum.

As noted above with reference to lens 502, projective lens systems of this type are taught in co-pending U.S. patent application Ser. No. 10/090,070 filed Mar. 1, 2002 of common assignee with the instant Application and fully incorporated herein by reference thereto; and, in co-pending United States Patent Application designated UCF—380CIP-002 filed Nov. 1, 2002 of common assignee also with the instant Application and fully incorporated herein by reference thereto.

The specification of the highly useful novel 42 degree lens 502 as disclosed in the design system shown in FIG. 2 is:

Effective focal length (EFL)=19.5382 mm; F#=1.62; Overall-length (OAL)=25.6459 mm; Field of view (FOV)=42°; EPD=12 mm The evaluation of the projective lens, shown in FIG. 2, has been analyzed and the resulting plots have been provided in FIGS. 3–4, 6, 9–13 along with the visual performance graphs shown in FIGS. 5, 7 and 8. The overall assessment of the projective lens design is shown to have negligible aberration in visual space.

Figure 3:
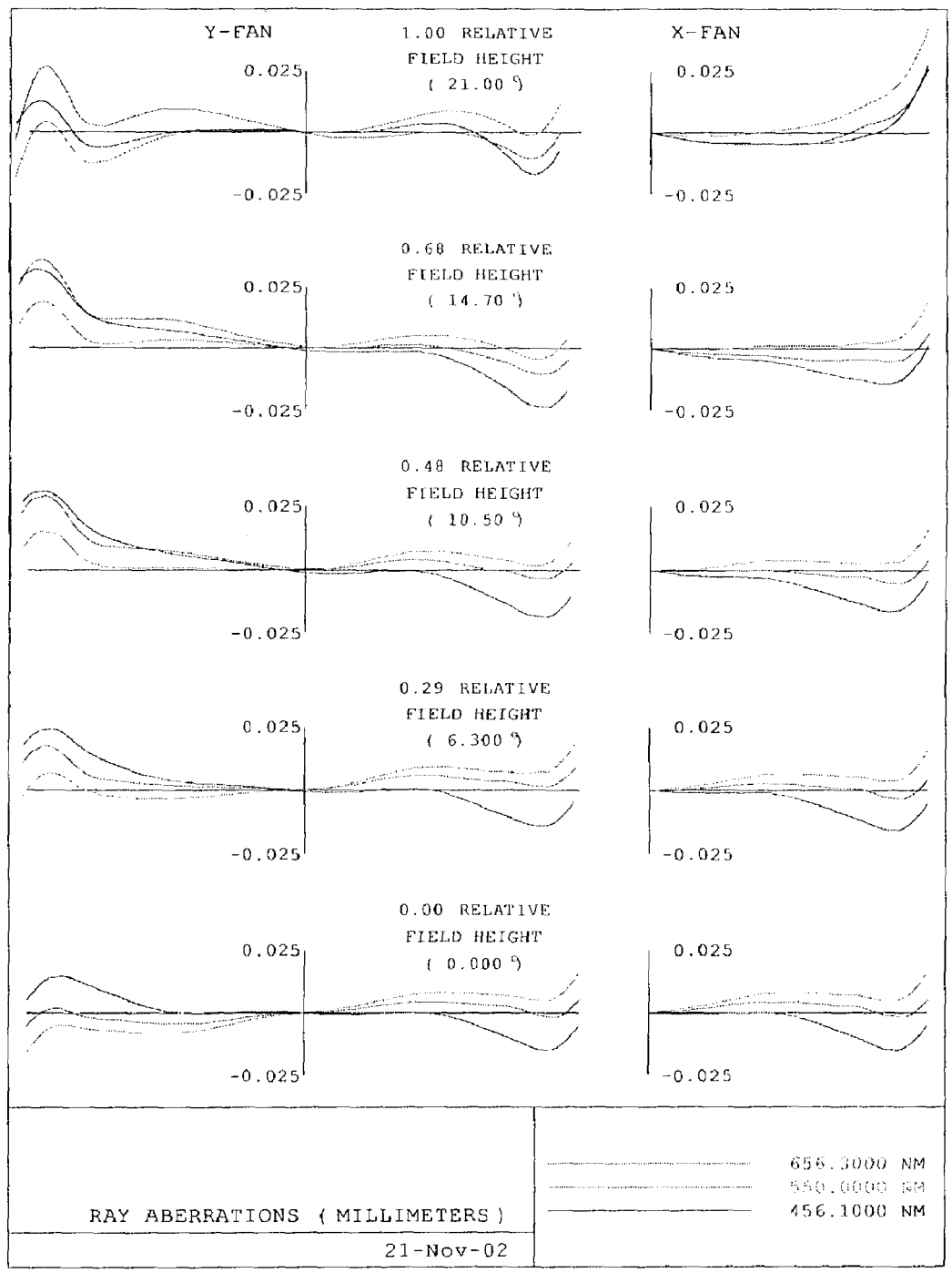
FIG. 3 shows the residual ray aberrations in the image plane over points in the field of view.

FIG. 3 shows various points in the field 0, 0.3, 0.7 and 1 in order to determine what residual aberrations are present in the referenced optical lens system. The X-Y ray fan plot has a maximum vertical range of ±0.025 mm having residual aberrations which are further evaluated.

Figure 4:
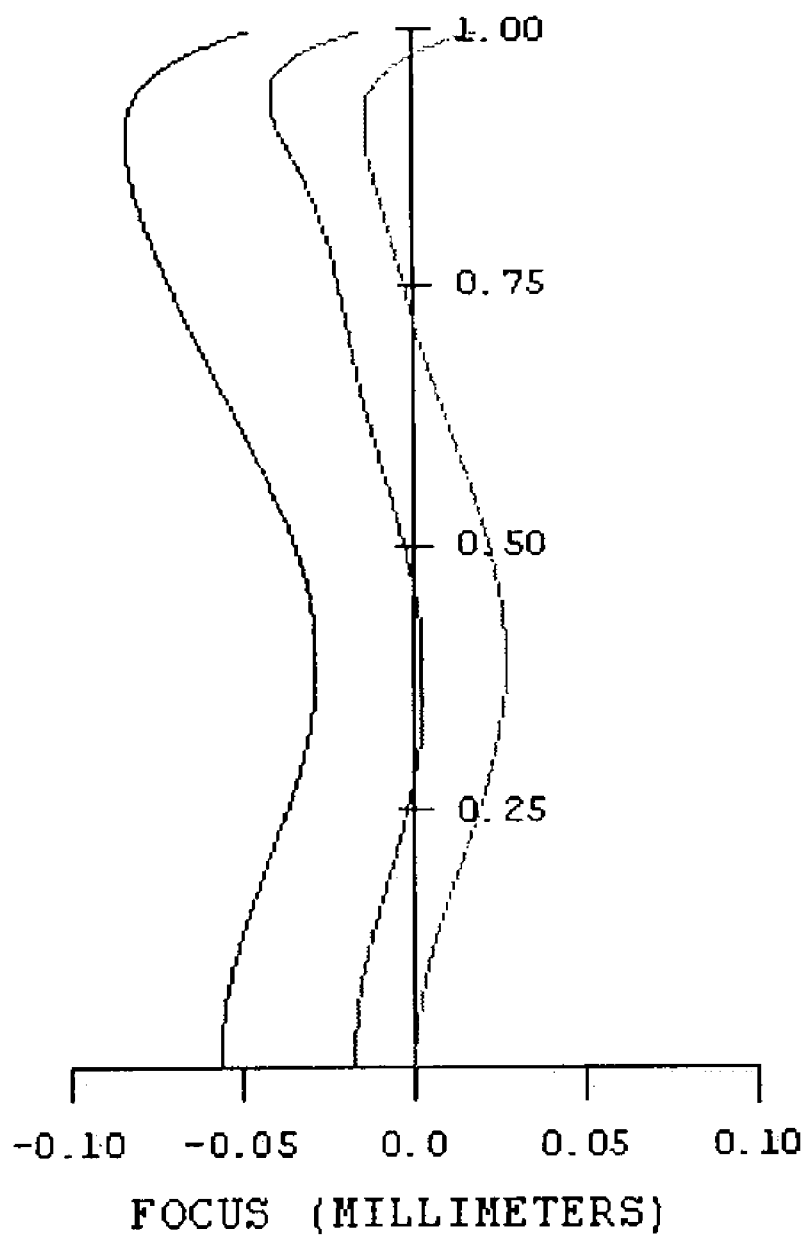
FIG. 4 shows the longitudinal spherical aberration curves shifted on the longitudinal axis denoting some residual lateral color occurring in visual space across the spectral wavelengths.

FIG. 4 quantifies spherical aberration across wavelengths. The shapes of the curves are the same for all three wavelengths meaning no spherochromatism. The curves are shifted on the longitudinal axis denoting some residual lateral color will occur in visual space. Lateral color in visual space is further quantified in FIG. 9.

Figure 5:
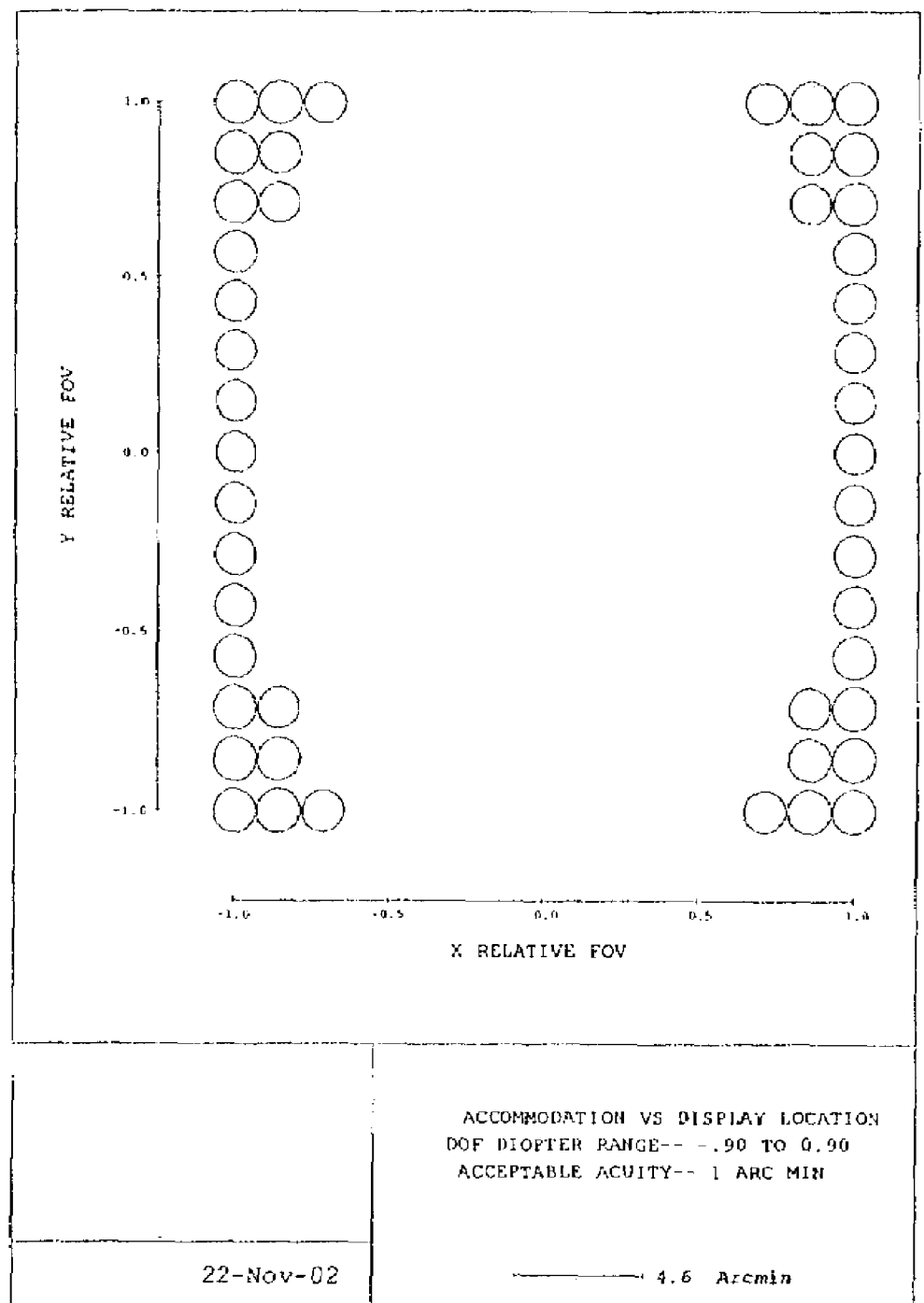
FIG. 5 illustrates the residual blur of the perceived image which shows to be about 1.3 arcmin at all points in the image vs. display location.

FIG. 5 shows the accommodation vs. display location the largest circle measures approximately 0.8 mm on the Figure, corresponding to about 1.3 arcmin which is about human visual acuity.

Figure 6:
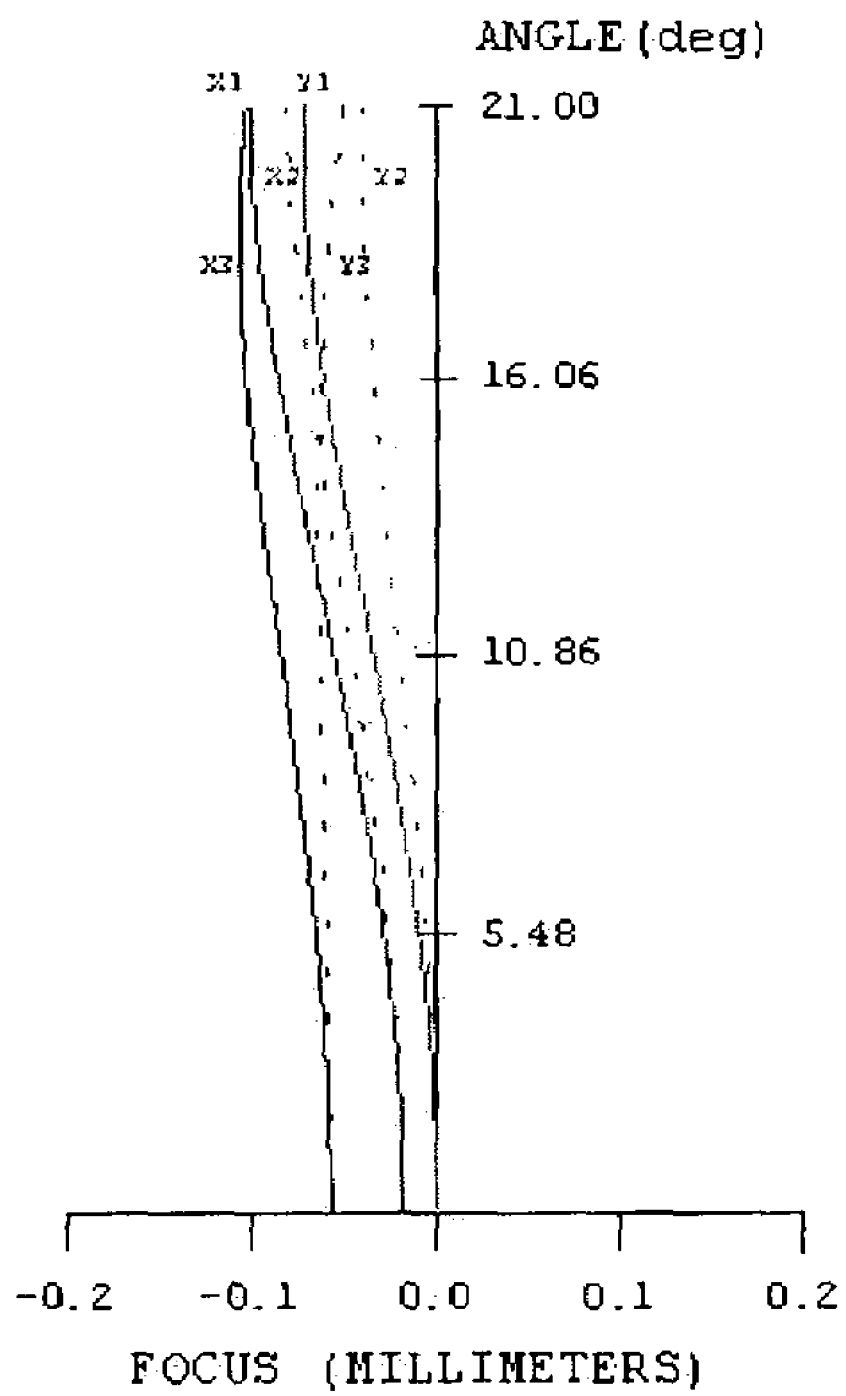
FIG. 6 shows the astigmatic field curves over the entire field of view with the residual lateral color.
Figure 8:
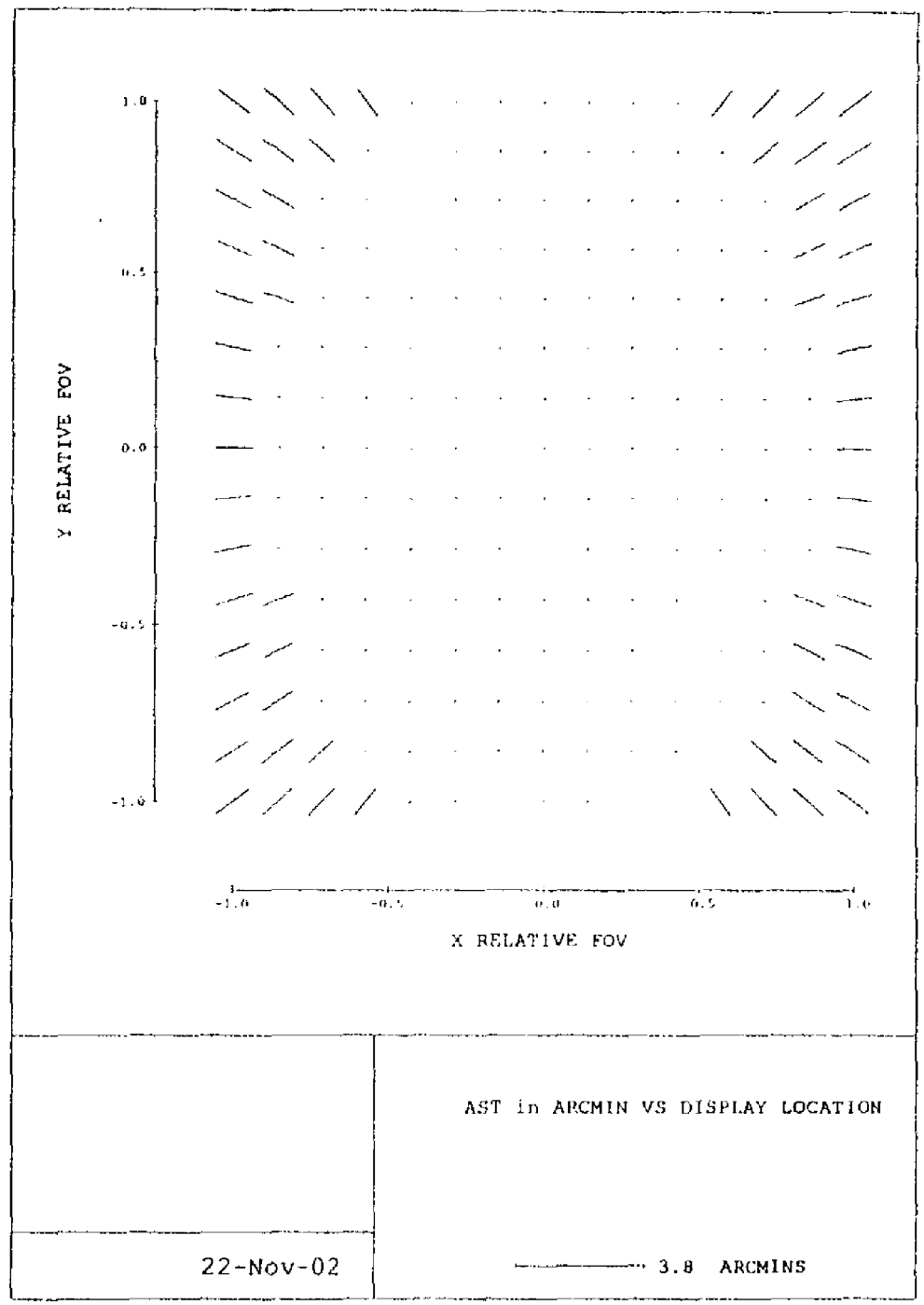
FIG. 8 shows the astigmatism in arcminutes versus display location of the final image being projected from the miniature display inside the HMPD on the image plane.

FIG. 6 shows the astigmatic field curves of the projection lens which are further evaluated in FIG. 8.

Figure 7:
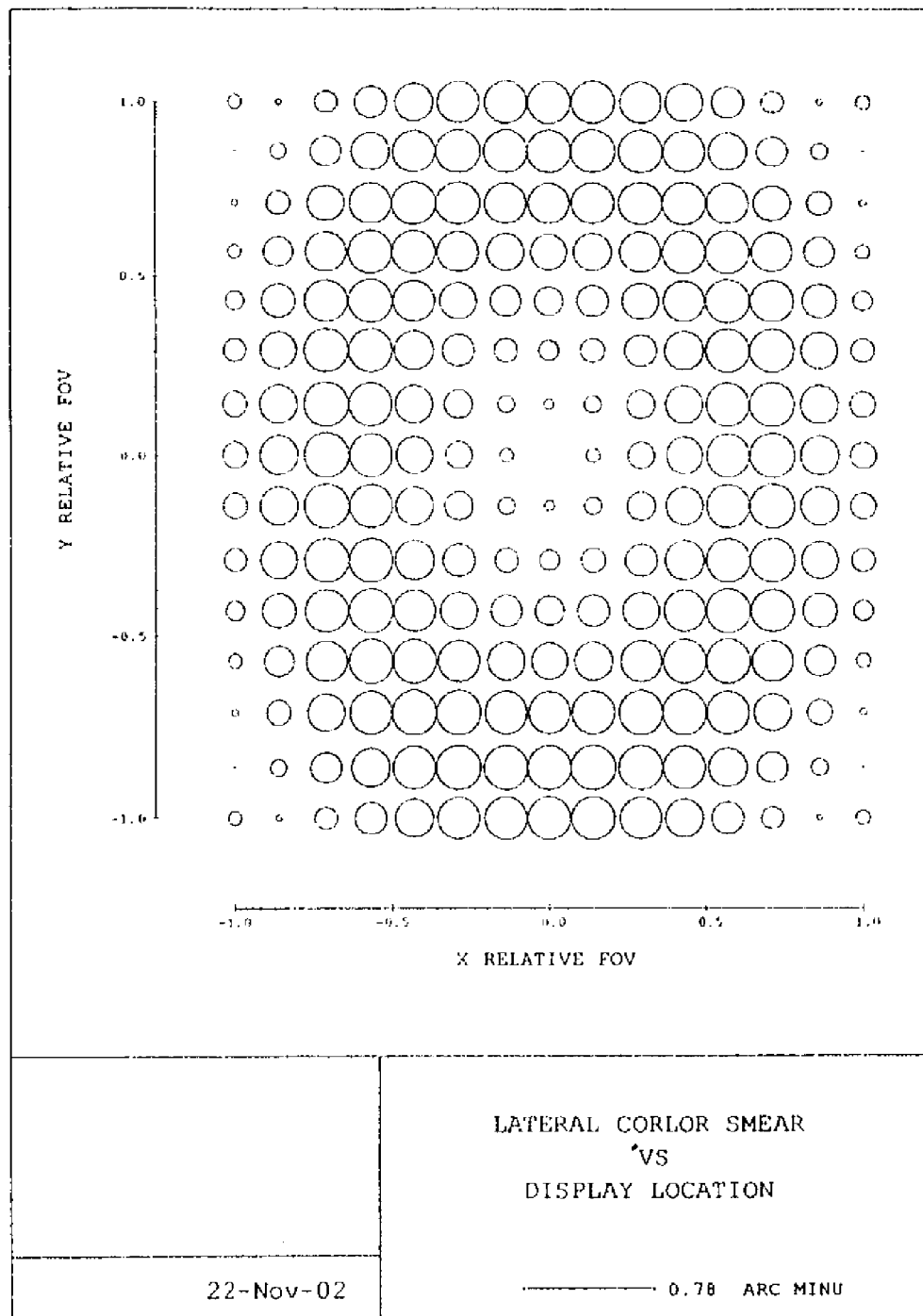
FIG. 7 shows the residual lateral color smear vs. display location to be less than about 1 arcmin over the entire field of view.

FIG. 7 shows lateral color smear vs. display location. The variation is about 0.25 arcmin, which can not be resolved by the human eye; therefore one can neglect lateral color.

FIG. 8 shows astigmatism curves expressed in arcminutes. The amount of astigmatism results in about 1.2 arcminutes which is about human visual acuity.

Figure 9:
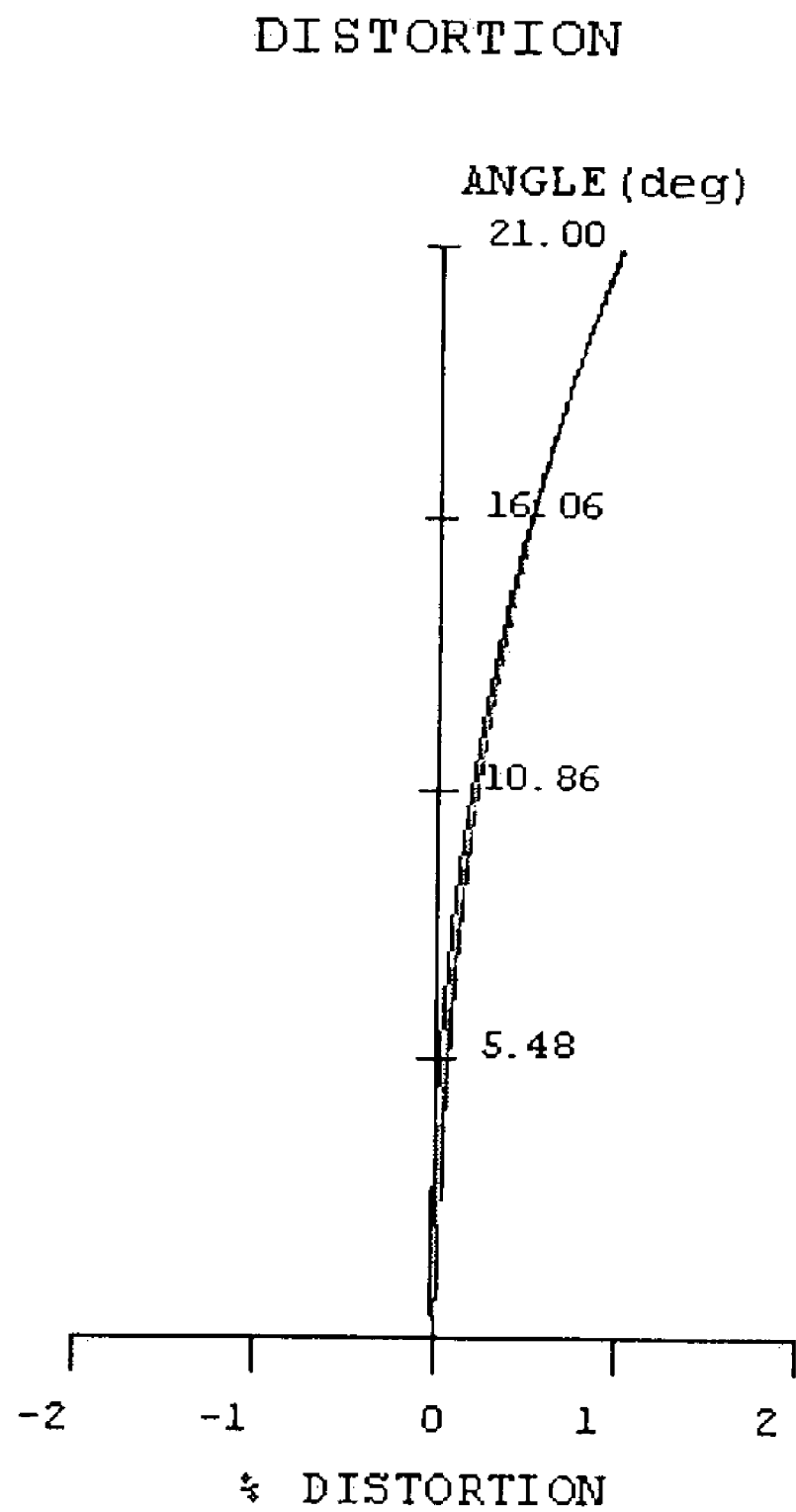
FIG. 9 shows the amount of residual distortion to be about 1% over the entire field of view.

FIG. 9 shows an amount of distortion of 1% at the edge of the field of view. Distortion warps the virtual image displayed by either an elongation in the longitudinal image axis called barrel distortion or pincushion causing the sides of the virtual image to move inward.

Figure 10:
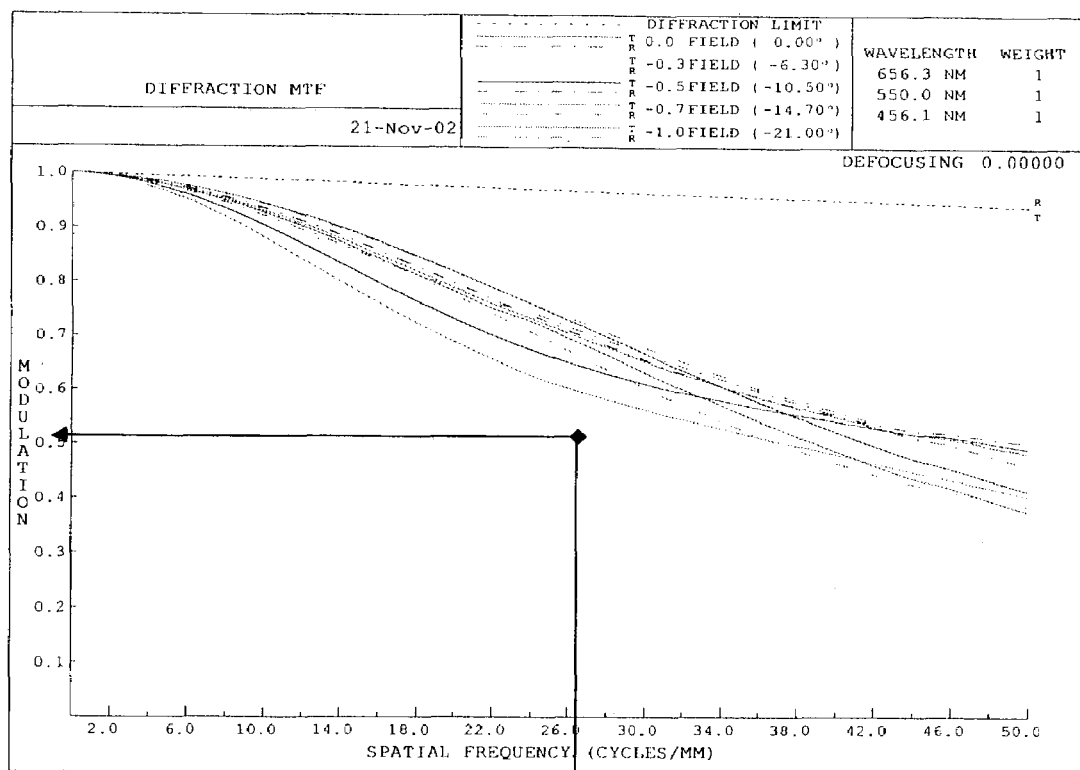
FIG. 10 shows the Diffraction MTF curves which illustrate how different spatial frequency of a scene is perceived.

FIG. 10 shows the MTF plot which has a design criterion of 20% modulation at 24 cycles/mm. In the design of the invention, it is shown that at 24 cycles/mm, the modulation is above 60%. A minimum of 20% is typically required. Thus, this lens performance supersedes the requirements.

Figure 11:
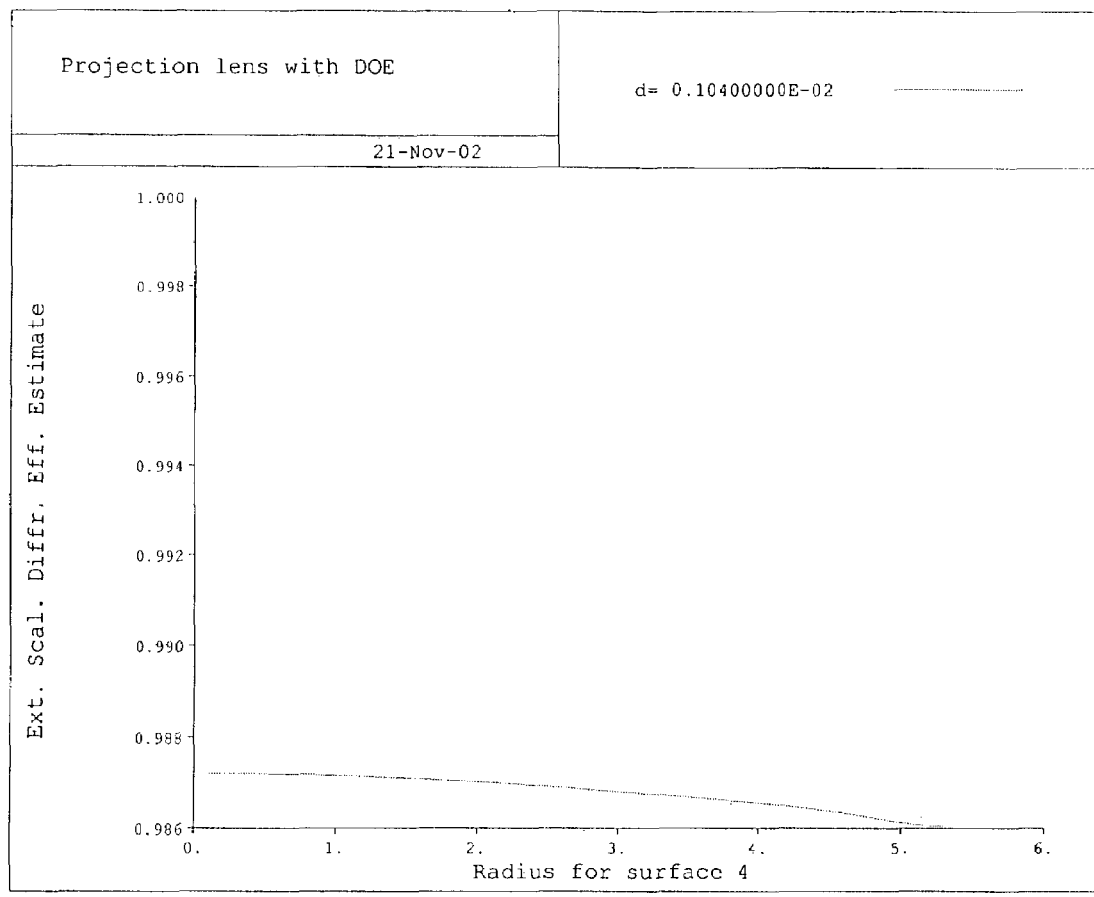
FIG. 11 shows the Scalar Diffraction Efficiency Estimate versus apparent height of the diffraction optical element.

FIG. 11 shows the scalar diffraction efficiency which is estimated for a lens radius of 5.517 mm at 98.7%.

Figure 12:
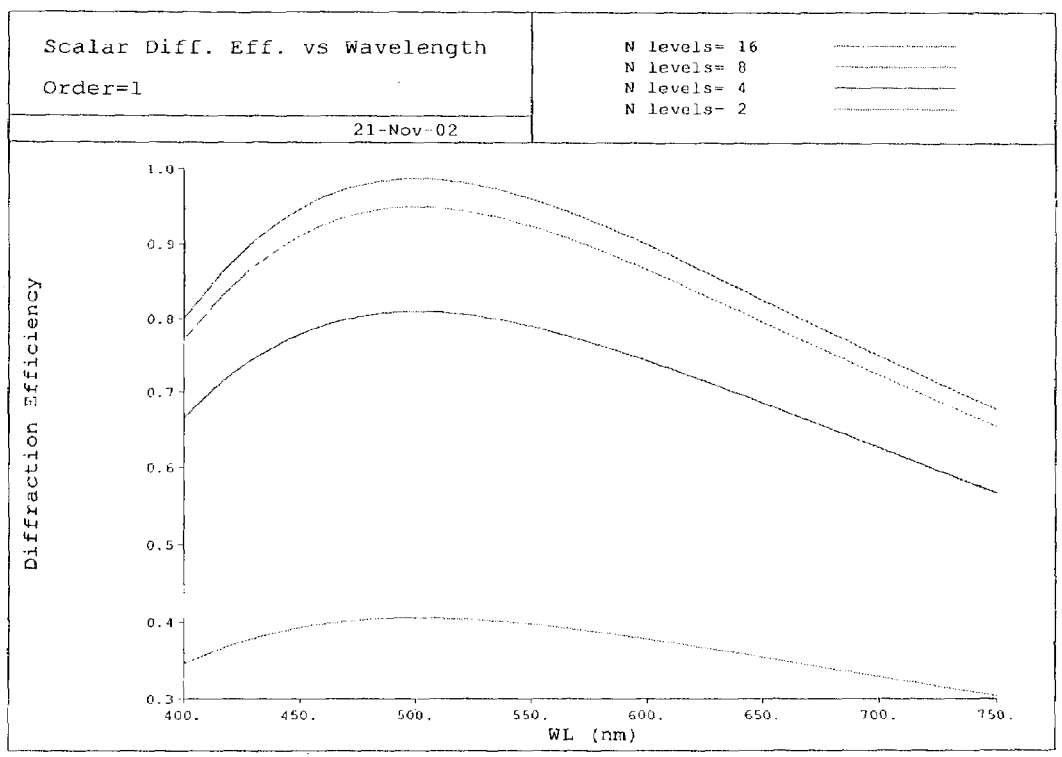
FIG. 12 shows the Scalar Diffraction Efficiency versus Wavelength of the Diffractive Optical Element (DOE) optical element.

FIG. 12 shows the scalar diffraction efficiency vs. wavelength for the number of zones "N" levels of the diffractive optical element (DOE), with a vertical axis as percentage and the horizontal axis representing the visible spectrum.

Figure 13:
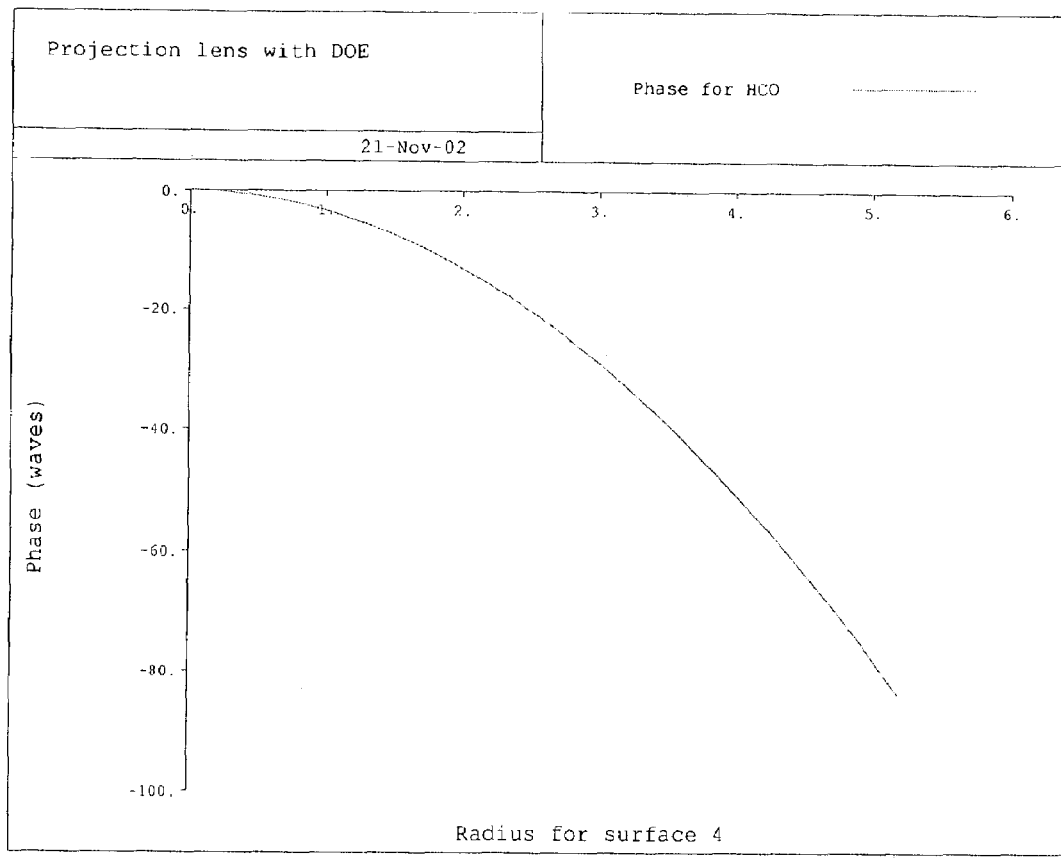
FIG. 13 shows the surface profile of the DOE.

FIG. 13 shows the continuous phase profile across the DOE radius in lens unit.

Figure 14:
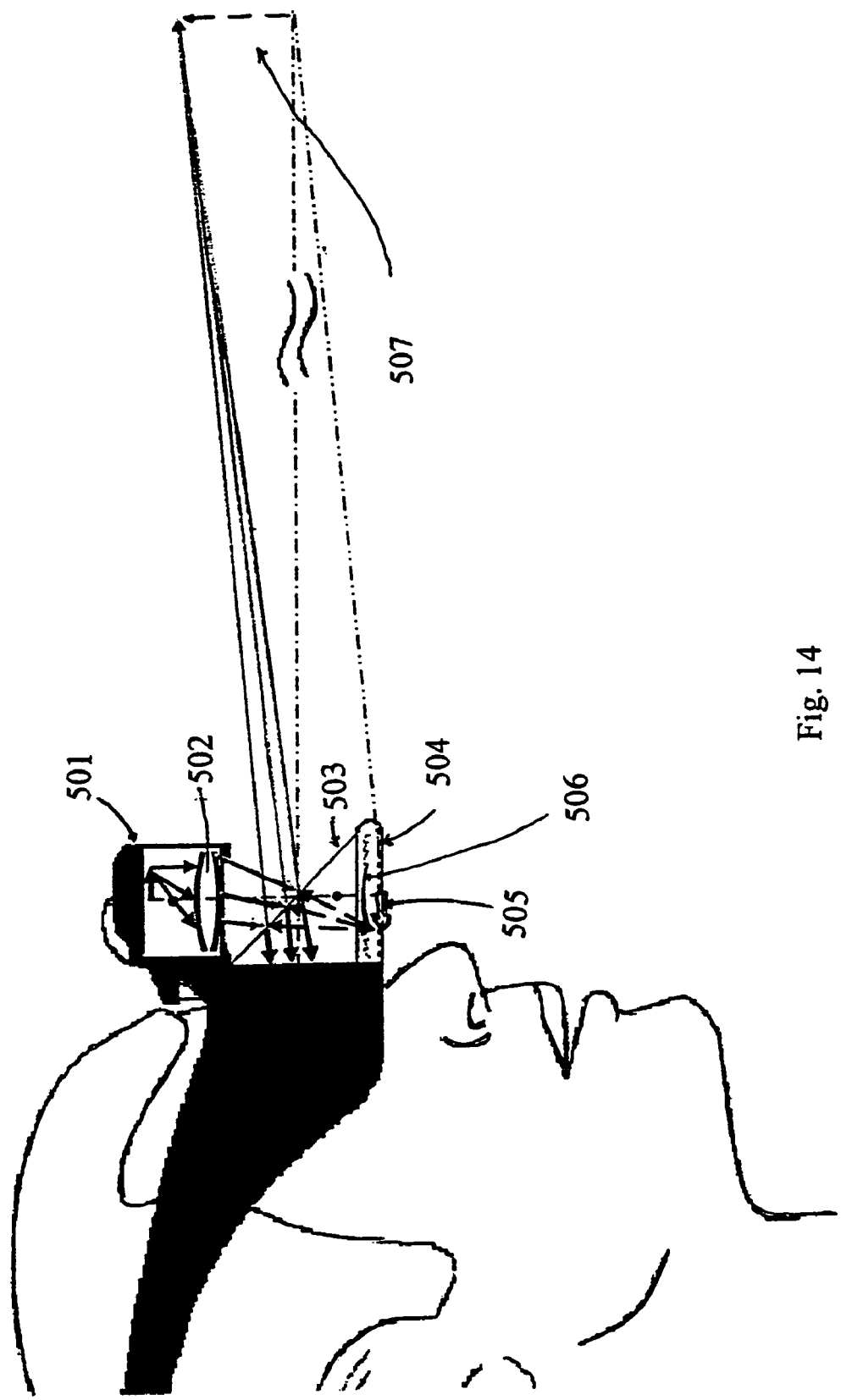
FIG. 14 shows how the HMPD can be attached to the user's head.

FIG. 14 shows a HMPD attached to a user's head and containing fully the integration of the phase conjugate material 504, material and the lens, 506 and as earlier emphasized in the discussion of FIG. 1 with respect to the 506 invention detailed herein, all the components, i.e., 501–506, and 508–509, which provides the virtual environment seen by the user's eye, 509 are located within the helmet (dotted lines) although one or more of the components 501, 502, 503, 504, 506, 507, 508 and projected image, 505, can when appropriate be located outside of the helmet.

Refer again to FIG. 2 for showing of the final layout of the projection lens. As therein,

501 —Miniature display
502 —Projection lens
510—Glass singlet 1
511—Plastic singlet 1
512—Stop
513—Plastic singlet 2
514—Glass singlet 2
515—Single field flattener

TABLE 1

Optical lens specification

| Parameter | Specification |
|---|---|
| Object: Color OLED | |
| a. Size | Approximately 0.6" inch in diagonal |
| b. Active display area | Rectangle, approximately 9 mm × approximately 12 mm |
| c. Resolution | 800 × 600 pixels |
| Lens: | |
| a. Type | Projection lens |
| b. Effective focal length | Approximately 19.5 mm |
| c. Exit pupil diameter | Approximately 12 mm |
| d. Eye relief | Approximately 25 mm |
| e. No. of diffractive surface | Approximately 1 |
| Other Parameters: | |
| Wavelength range | Approximately 656 to approximately 486 nm |
| FOV | Approximately 42.0° in diagonal |
| Distortion | Approximately <2.0% over entire FOV |

The nature of this invention is to incorporate projective optics and phase conjugate material without the inhibiting, hindering and limiting requisite use of an external phase conjugate material to provide a see-through head mounted projection display. A key component of the invention is not only the integration of the phase conjugate material and projection optics within the HMPD but surprisingly also the use of a lens in combination with this novel projection enclosed system markedly facilitates the operability of this revolutionary technology. In previous head mounted projection displays phase conjugate material had to be placed in the environment to display images, but in this invention the user is not limited by the requisite use of an exterior phase conjugate material.

Refer again to FIG. 1 for showing of the final layout of the components within the HMPD which are identified with reference numbers 501 through 507. As shown therein, 501—Miniature display
502—Projection lens
503—Beam splitter
504—Phase conjugate material
505—Projected image
506—Lens
507—Intermediary image
508—Entrance pupil
509—Eye As shown in FIG. 1, the light from the miniature display 501 strikes the beam splitter 503 after passing through the projection lens 502. The miniature display 501 may display a virtual image as well as a computer generated image. A portion of the light striking the beam splitter 503 is reflected to produce the intermediary image 507. The remainder of the light passes through the beam splitter 503 and lens 506 and produces the projected image 505 (hollow arrow) on the phase conjugate material 504. The light from the projected image 505 is reflected back to the beam splitter as shown by the upwardly directed arrows. The reflected light strikes the beam splitter 503 and is reflected toward the eye 509 within the area shown as the pupil entrance 508. The lens 506 can be an optical element such as a Fresnel lens, microlenslet array, prism, flat mirror, curved mirror, folding mirror, phase plate, adaptive optic component, micro-optics component and micro-phase plate component or any combination of the optical lenses. Placement of the lens 504 and phase conjugate material 504 at a location outside of the user's line of sight extends usage to see-through augmented reality to produce images using the see-through head mounted projective display system.

The invention improves upon not being limited to use of the phase conjugate material in the environment but dramatically extends the use of outdoor see-through augmented reality. Furthermore, this invention extends the use of projection head mounted displays to clinical guided surgery, medical surgery, outdoor augmented see-through virtual environment for military training and wearable computers, and for use with binoculars. In these latter applications, a head mounted projection display (HMPD) optical lens assembly comprising in combination a projection lens having a field of view (FOV) of up to approximately ninety degrees and of an overall weight of less than approximately 10 grams; and a micro display ranging from approximately 0.2 inches up to approximately 2 inch diagonal size whereby an intermediate image will be viewed by the user's eye is surprisingly and particularly useful.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A head mounted projection display (HMPD) optical compact lens assembly for monocular use comprising:
   (a) a display for displaying a computer generated image;
   (b) a projection lens for projecting virtual images and said computer generated image to a user's eye in a monocular setting;
   (c) only one phase conjugate component for receiving and projecting said virtual images; and
   (d) an optical lens for imaging of said phase conjugate component, wherein the display, projection lens, phase conjugate component and the lens are within the HMPD optical compact lens assembly.

2. The HMPD assembly of claim 1 wherein said optical lens for imaging is a Fresnel lens.

3. The HMPD assembly of claim 1 wherein said optical lens for imaging is a microlenslet array.

4. The HMPD assembly of claim 1 wherein said optical lens for imaging is a prism.

5. The HMPD assembly of claim 1 wherein said optical lens for imaging is a flat mirror.

6. The HMPD assembly of claim 1 wherein said optical lens for imaging is a curved mirror.

7. The HMPD assembly of claim 1 wherein said optical lens for imaging is a phase plate.

8. The HMPD assembly of claim 1 wherein said optical lens for imaging is an adaptive optics component.

9. The HMPD assembly of claim 1 wherein said optical lens for imaging is a micro-optics component.

10. The HMPD assembly of claim 1 wherein said optical lens for imaging is a micro-phase plate.

11. The HMPD assembly of claim 1 wherein said optical lens is selected from at least one of: Fresnel lens; microlenslet array; prism; flat mirror; curved mirror; phase plate; adaptive optics component; micro-optics components; and, micro-phase plate.

12. The HMPD assembly of claim 1, wherein said assembly includes a folding of the optical means.

13. The HMPD assembly of claim 1 wherein said display is approximately 0.6 inch diagonal.

14. A head mounted projection display (HMPD) optical compact lens assembly for binocular use comprising:
   (a) a means for displaying a computer generated image onto a micro display;
   (b) optical means for projecting virtual images and said computer generated display to a user's eye in a binocular setting to provide a see-through augmented reality;
   (c) only one phase conjugate material component within the HPMD assembly for receiving and projecting said virtual images; and
   (d) optical means for imaging of said phase conjugate material component wherein the displaying means, optical projection means, phase conjugate component and the optical imaging means are within the HPMD assembly.

15. The HMPD assembly of claim 14 wherein said optical means for imaging is a Fresnel lens.

16. The HMPD assembly of claim 14 wherein said optical means for imaging is a microlenslet array.

17. The HMPD assembly of claim 14 wherein said optical means for imaging is a prism.

18. The HMPD assembly of claim 14 wherein said optical means for imaging is a flat mirror.

19. The HMPD assembly of claim 14 wherein said optical means for imaging is a curved mirror.

20. The HMPD assembly of claim 14 wherein said optical means for imaging is a phase plate.

21. The HMPD assembly of claim 14 wherein said optical means for imaging is an adaptive optics component.

22. The HMPD assembly of claim 14 wherein said optical means for imaging is a micro-optics component.

23. The HMPD assembly of claim 14 wherein said optical means for imaging is a micro-phase plate.

24. The HMPD assembly of claim 14 wherein said optical means is selected from at least one of: Fresnel lens; microlenslet array; prism; flat mirror; curved mirror; phase plate; adaptive optics component; micro-optics component; and, micro-phase plate.

25. The HMPD assembly of claim 14 wherein said assembly includes a folding of the optical means.

26. The HMPD assembly of claim 14 wherein said micro display is approximately 0.6 inch diagonal.

27. A method of viewing internally generated virtual images in a head mounted projection display (HMPD) using an optical lens assembly comprising the steps of:
 (a) positioning a HMPD helmet on a user's head;
 (b) displaying virtual images to a user's eye by optical display means disposed within said helmet;
 (c) providing only one phase conjugation material component below the eyes of the user for reflecting said virtual images from a micro display source integrated with an interior surface of said helmet to said user's eye; and
 (d) providing a lens means for magnification of said phase conjugate material component whereby said magnified screen means is further projected to the user's eyes.

28. A method of viewing internally generated virtual images in a head mounted projection display (HMPD) using an optical lens assembly comprising the steps of:
 (a) positioning a HMPD helmet on a head of a user;
 (b) displaying virtual images to an eye of the user by optical display means disposed within said helmet;
 (c) incorporating only one phase conjugate component for receiving and projecting said virtual images from a miniature display inside the helmet; and
 (d) incorporating a lens inside the helmet for imaging of said projected virtual images from said phase conjugate component, wherein said virtual image are further projected to said eye of said user.

29. A head mounted projection display (HMPD) assembly comprising:
 (a) a miniature display for displaying an image;
 (b) a projection lens for projecting said image from said miniature display;
 (c) only one phase conjugate component below said projection lens for receiving and reflecting said projected image from said projection lens; and
 (d) an imaging lens within the focal plane of said phase conjugate component for magnifying of said phase conjugate component, wherein a reflected virtual image is projected to an eye of a user.

* * * * *